March 16, 1971 H. W. FRIESEN 3,570,234
PAIR FLYER TWISTER USING FLEXIBLE BOW
Filed Jan. 8, 1969 2 Sheets-Sheet 1
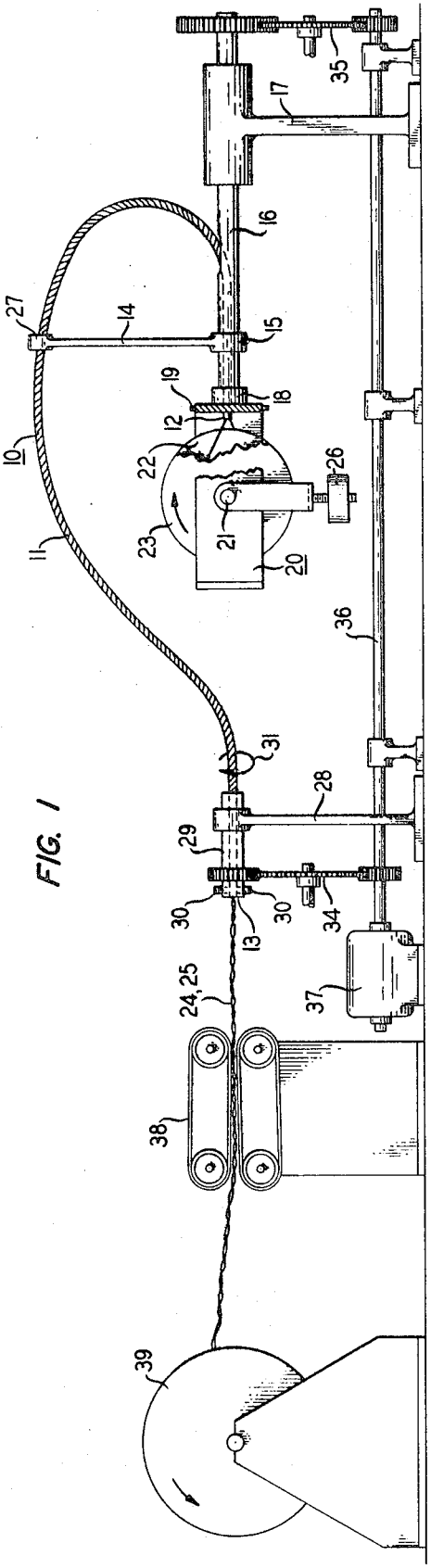
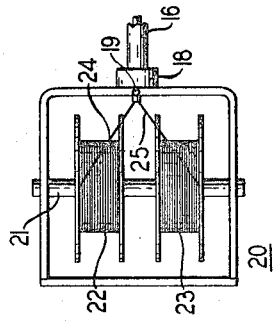
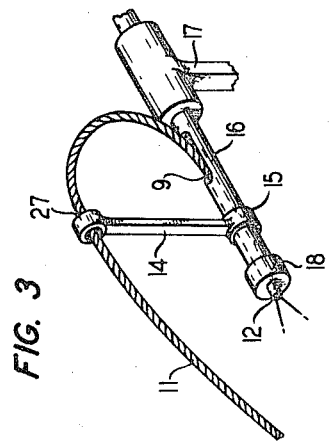
INVENTORS H.W. FRIESEN
W.F. MAC PHERSON
BY Charles E. Graves
ATTORNEY 3,570,234
PAIR FLYER TWISTING USING
FLEXIBLE BOW
Harold W. Friesen and William F. MacPherson, Warren Township, Somerset County, N.J., assignors to Bell Telephone Laboratories, Incorporated, Murray Hill, N.J.
Filed Jan. 8, 1969, Ser. No. 789,750
Int. Cl. D01h 1/04, 7/24
U.S. Cl. 57—59                    6 Claims

ABSTRACT OF THE DISCLOSURE

This disclosure describes a flyer-type conductor pair twister in which the bow consists of a flexible tube with two smaller flexible tubes within, through which two conductors are respectively threaded. The entrance end of the tube is fixed so that it does not rotate as the bow rotates. All conductor twist occurs between the bow exit and the take-up capstan. These being fixed points, the twist length is finely controllable.

FIELD OF THE INVENTION

This invention relates to the art of twisting conductor pairs for use in multipair telephone cable, for example. It more particularly relates to flyer-type twisters.

BACKGROUND OF THE INVENTION

The flyer-type twister has for years employed a tubular metallic flyer bow. Two conductors are fed into the bow at one end and exit at the other end with a twist imparted to them. The twist length depends on the speed of rotation of the bow and on the speed of the conductors through the bow.

As transmission bandwidths over multipair cable are increased, the precise control of twist length in such cable assumes an increasing importance. With all the advantages of present-day flyer type twisters, including low inertial moment, ease of speed change and threading, and low cost, the twist length deviation exhibited by conductors twisted on these machines is unacceptably high for future applications.

The principal problem is that the pair twist is imparted at varying points within the tube as it is cranked due to such factors as frictional variations, speed-ups, mechanical whipping of the conductors within the tube etc. It is of course not possible to control these factors by inserting conductor guides within the tube, as the twisting action depends on the conductors being free to revolve around one another in the tube. For this reason, the solution of causing twist to occur only between two precisely defined points, which would result in the desired fine twist control, is unattainable with the existing flyer-type twisting apparatus.

Accordingly, a principal object of the invention is to precisely control the twist length imparted to a pair of conductors.

An added object of the invention is to limit the point of application of twist in a flyer-type twister to a specified region beyond the bow exit.

A further object of the invention is to eliminate twisting of the conductors within the bow, thus to eliminate the effect of disturbances within the bow upon the twist length.

SUMMARY OF THE INVENTION

According to the invention, a flexible tube consisting of a steel spring helix which contains guide means for each wire is employed as the bow of the flyer twister. Guides are anchored at least at the flexible bow tube exit and entrance ends. The tube entrance end is fixed to the payoff carriage. The flexible tube exit end is driven at twice the selected crank velocity. The wires are threaded through the guide means and are drawn by a belt capstan while the bow is cranked in the manner described. All the twist occurs between the exit end of the flexible tube and the drive capstan.

In accordance with a major facet of the invention, the internal guide means in the flexible tube advantageously are two smaller flexible tubes coextensive in length with the main shaft.

The invention, its further objects, features and advantages will be readily comprehended from a reading of the description to follow of an illustrative embodiment.

DESCRIPTION OF THE DRAWING

FIG. 1 is a schematic side perspective diagram showing the inventive wire twister installed in an operating conductor pair twisting line;

FIG. 3 is a schematic perspective detail of the flexible bow and crank mounting;

FIG. 4 is a top detail view of the conductor reel mounting at the bow entrance.

DETAILED DESCRIPTION OF AN ILLUSTRATIVE EMBODIMENT

Figure 2:
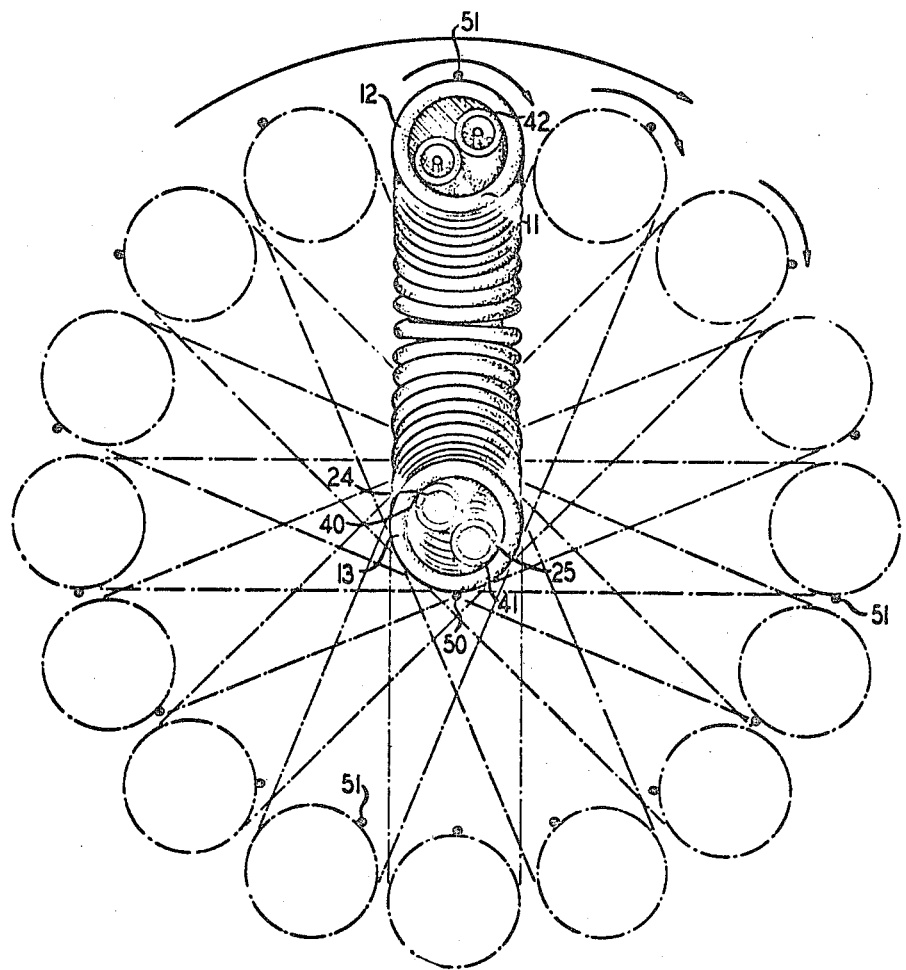
FIG. 2 is a diagram depicting various positions of revolution of the flexible bow twister.

FIG. 1 depicts a complete conductor pair twisting line, consisting of flyer twister 10 with associated feeding, drawing and cranking equipment. Flyer twister 10 according to the invention consists of a flexible bow 11 which is depicted in detail in FIG. 2. The entrance end 12 of flexible bow 11 is anchored by set screws 19, for example, to reel assembly 20, so that it is not free to rotate, as seen in FIG. 4. Flexible bow 11 is bowed out of shaft 16 through slot 9. Bow 11 is held in a bearing fit by crank 27 which is connected to the rotating shaft 16 through coupling 15 and arm 14. Shaft 16 is mounted for rotation in the stationary bearing assembly 17.

The exit end 13 of flexible bow 11 is fixedly held at the end of a shaft 29 as with set screws 30. Shaft 29 in turn is mounted for rotational movement in bearing assembly 28, which holds shaft 29 substantially in axial alignment with the shaft 16.

A bearing flange 18 positioned at the end of shaft 16 supports the reel assembly 20 which is depicted in FIG. 4. Assembly 20 consists of a shaft 21 on which reels 22 and 23 are positioned so that insulated conductors 24 and 25 can be fed into the flexible shaft 11 in a manner to be described. Reel assembly 20 also includes a weighting means such as 26 which maintains the assembly stationary while the shaft 16 rotates. Drive linkages 34, 35 operating from shaft assembly 36 driven by motor 37, rotate the shafts 29, 16 respectively.

Figure 5:
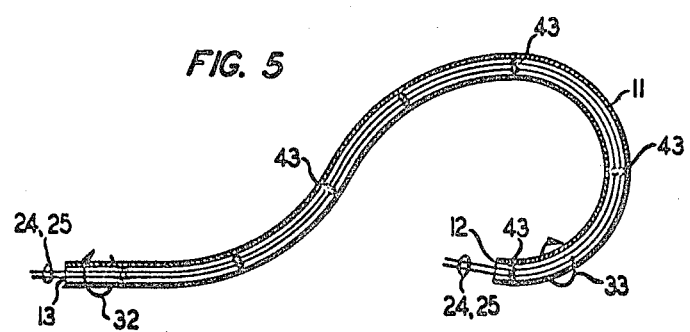
FIG. 5 is a schematic side view and partial cutaway of the flexible bow.

The insulated conductors 24, 25 are guided in flexible bow 11 by, for example, figure-eight bushings 43 as depicted in FIG. 5. The bushings 43 are lodged within the bow 11; and the conductors are threaded through them. The bushings 43 serve to prevent the conductors 24, 25 from flopping over each other as the bow is cranked.

A preferred form of the invention is depicted in FIG. 2, which shows the flexible bow flyer made up of three helical wound springs or tubes. The larger flexible tube 11 houses two smaller diameter spring tubes 40, 41, which are coextensive in length with tube 11. The smaller springs 40, 41 are wound one with a right-hand twist and the other with a left-hand twist to prevent meshing. These smaller springs 40, 41, are equal in diameter and fit into tube 11 in a slight interference fit so to prevent internal slippage. Insertion of the smaller springs into the larger spring is accomplished for example by slightly uncoiling the larger spring to increase its diameter. The ends 12, 13 are filled with epoxy or like sealer to fasten the respective ends of the springs 11, 40, 41.

Conductors 24, 25 are threaded through the springs 40, 41; and are drawn in each case by the action of belt capstan 38. The twisted conductors are stored on a take-up reel 39.

Exemplary dimensions for the springs 11, 40, and 41 follow. For the smaller springs 40, 41, .016 inch diameter music wire was wound on a .089 inch diameter mandrel. The large flexible tube 11 comprises .048 inch music wire wound on a .25 inch diameter mandrel.

The springs 40, 41 in operation remain essentially parallel. If it is desired to further tie the outer and inner springs together in a more rigid manner, a braided fabric construction (not shown) can be used.

OPERATION

An understanding of the basic operation of the flexible tube 11 when used as a bow, may be gained by referring to FIG. 5. Assume that the tube 11 is freely held in a stationary plane and that end 12 is turned in a direction indicated by arrow 33 and at some angular velocity W. It is clear that end 13 will turn at the same angular velocity W, but in the opposite direction, as indicated by arrow 32. If now the bow 11 is cranked (such as in FIG. 1) at angular velocity W and in a direction opposite to that of the rotation at end 12, then end 12 will stand still and end 13 will revolve at 2W.

Consequently, if end 13 is revolved at 2W and if the crank arm 14 (again as in FIG. 1) is rotated in the same direction at an angular velocity W, the end 12 will not rotate. If the flexible tube 11 includes the smaller flexible tubes 40, 41 as in FIG. 2, there will be no wind-up of the smaller tubes nor of the flexible tube 11. There being no wind-up in the tubes, wires running through the flexible tubes 40, 41 will remain untwisted inside the tubes.

That flexible tube end 12 in fact stands still if the second end 13 rotates at an angular velocity 2W while the bow is cranked with a velocity W is more readily visualized by a study of the FIG. 2 positions of point 51 relative to the position of point 50 as the various motions occur. It is understood that in practice the ends 12, 13 of flexible bow 11 are in axial alignment; FIG. 2 shows the ends 12, 13 separated merely for purposes of illustration.

Fixing the flexible tubes 40, 41 to the tube 11 at both ends 12, 13, and choosing the outside diameter of tubes 40, 41 equal to half the inside diameter of tube 11 assures a snug fit and prevents any tendency of the interior tube to tangle. The differential speeds at the shaft ends can be achieved in numerous fashions, the drive linkages 34, 35 and shaft assembly 36 being but one alternative.

In accordance with the principal inventive benefit, all twist imparted to conductors 24, 25 is applied between two precisely defined points: namely, the end 13 of flexible bow 11 and the take-up belt capstan 38.

The spirit of the invention is embraced in the scope of the claims to follow.

What is claimed is:
1. A flyer twister for conductor pair, comprising:
a flexible main tube formed as a flyer bow;
two smaller flexible tubes in the main tube interior and substantially coextensive in length therewith;
a source of insulated conductors at the main tube input end;
means for cranking said bow;
means for controlling the rotation of the main tube input and output end, to prevent wind-up of said main tube during cranking; and
means for drawing a conductor from said source through each said smaller tube.

2. A flyer-type twister for twisting conductor pair to a specific twist length comprising:
a flexible spring tube shaped as a flyer bow, having input and output ends disposed about a common axis;
means for cranking said bow about said axis at an angular velocity W;
means for holding the input end of said bow stationary;
means for rotating the output end of said bow in the same sense as, and at an angular velocity twice that of, the cranking angular velocity W; and
means rigidly mounted within said flexible spring tube for maintaining said conductors substantially parallel during said cranking.

3. Apparatus pursuant to claim 2, wherein said maintaining means comprises first and second smaller flexible spring tubes snugly disposed within said flyer bow tube.

4. Apparatus pursuant to claim 3, further comprising means for anchoring the respective ends of said first and second smaller tubes to the corresponding ends of said flyer bow.

5. Apparatus pursuant to claim 4, wherein the outside diameters of said first and second smaller spring tubes are substantially equal to each other and also to one-half the inside diameter of said flyer bow tube.

6. Apparatus pursuant to claim 5, wherein said first and second smaller spring tubes each comprise steel wire and are wound with opposite helices.

References Cited
UNITED STATES PATENTS

| | | | |
|---|---|---|---|
| 2,147,065 | 2/1939 | Somerville | 57—58.38X |
| 2,457,402 | 12/1948 | Roetting | 57—58.36 |
| 2,723,525 | 11/1955 | Blaisdell | 57—58.36 |
| 2,956,391 | 10/1960 | Demmel et al. | 57—60 |
| 3,196,601 | 7/1965 | Haugwitz | 57—60 |
| 3,309,857 | 3/1967 | Haugwitz | 57—58.36X |

JOHN PETRAKES, Primary Examiner

U.S. Cl. X.R.

57—67

UNITED STATES PATENT OFFICE
CERTIFICATE OF CORRECTION

Patent No. 3,570,234          Dated March 16, 1971

Inventor(s) Harold W. Friesen and William F. MacPherson

It is certified that error appears in the above-identified patent and that said Letters Patent are hereby corrected as shown below:

The title at column 1, line 2, should read --twister-- rather than "twisting".

Signed and sealed this 22nd day of June, 1971.

(SEAL)
Attest:

EDWARD M. FLETCHER, JR.          WILLIAM E. SCHUYLEI
Attesting Officer                Commissioner of Pat